Feb. 21, 1933.　　　G. W. HAMILTON　　　1,898,725

CROSS ARM CLAMP

Filed Dec. 2, 1930

INVENTOR
George W. Hamilton.
BY Alpheus J. Crane
ATTORNEY

Patented Feb. 21, 1933

1,898,725

UNITED STATES PATENT OFFICE

GEORGE WELLINGTON HAMILTON, OF EVANSTON, ILLINOIS

CROSS ARM CLAMP

Application filed December 2, 1930. Serial No. 499,550.

This invention relates to cross arm clamps or fittings for attaching suspension insulators to their supporting cross arms, and has for one of its objects the provision of a cross arm fitting which may be readily placed upon the cross arm in any position along the length thereof, and which will prevent splitting of the cross arm and, at the same time, provide conductor bands surrounding the arm at spaced positions thereon.

A further object is to provide a cross arm clamp in which the weight of the insulator and supported conductor will tend to tighten the clamp upon the cross arm.

A further object is to provide a cross arm clamp made of separable parts with a wedge lock to adapt the clamp to arms of varying dimensions.

A further object is to provide a cross arm clamp which shall be of improved construction and operation.

Other objects and advantages will appear from the following description.

The invention is exemplified by the combination and arrangement of parts shown in the accompanying drawing and described in the following specification, and it is more particularly pointed out in the appended claims.

Figure 1:
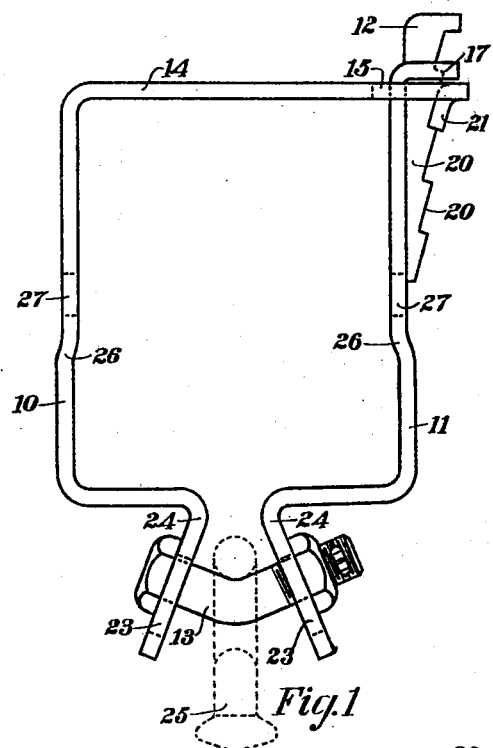
Fig. 1 is an elevation of a cross arm clamp showing one embodiment of the present invention.
Figure 2:
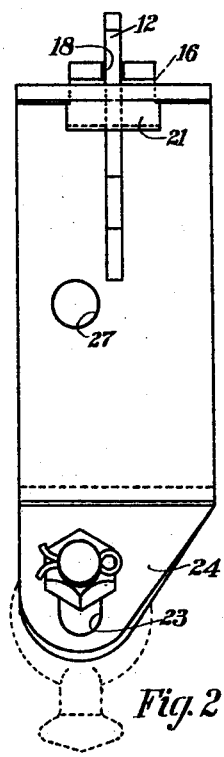
Fig. 2 is an elevation looking from the right in Fig. 1.

In the support of insulators from wood cross arms, it is frequently desirable to provide a band or clamp extending about the cross arms by means of which the insulator may be attached to the arm. Sometimes it is desirable to apply this clamp at a point between supports in such a position that the clamp cannot be slipped over the arm from the end. It is also desirable to employ a clamp which grips the cross arm with sufficient force to retain the clamp in place and prevent the arm from splitting. These and other advantages are secured by the present invention; one embodiment of which is shown in the accompanying drawing and in which the numeral 10 designates one member of a separable fitting, and the numeral 11 the complementary member; the two being secured together by a wedging detent 12 and by a supporting bolt 13. The members 10 and 11 are made of flat plates or bars bent to extend about the cross arms; the member 10 having a horizontal arm 14 which rests upon the top face of the cross arm. The arm 14 is perforated at 15 adjacent the end thereof and the member 11 is provided with a tongue 16 arranged to extend through the perforation 15. The tongue 16 has a horizontally bent portion 17 having a slot 18 therein for receiving a wedged lock 12. The wedged lock 12 is provided with stepped teeth 20 which contact with a keeper 21 bent down from the slot 15 in the arm 14. In assembling the parts on the cross arm, the member 10 is placed in position with the arm 14 resting upon the top of the cross arm and the tongue 16 is then inserted through the opening 15. The lower ends of the members 10 and 11 are then brought together beneath the cross arm and the bolt 13 inserted in place in slots 23 formed in outwardly inclined extensions 24 in the lower ends of the members 10 and 11.

Figure 3:
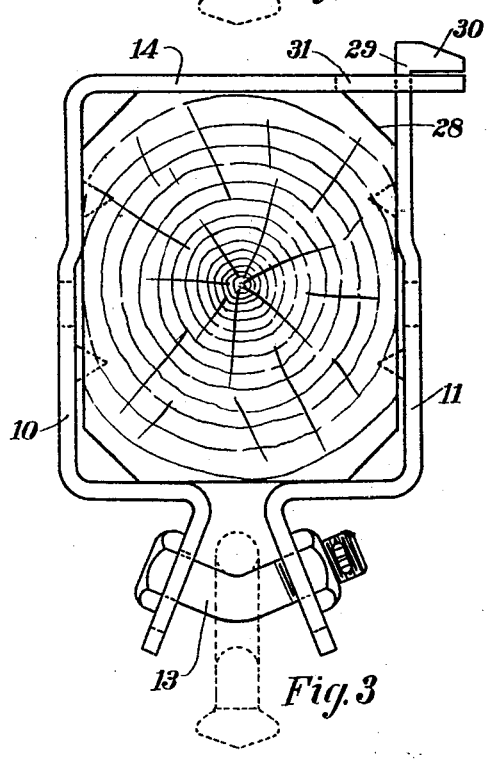
Fig. 3 is a view similar to Fig. 1 showing a modified form of the invention.

The detent 12 may then be driven into place to tighten the clamp against the lateral faces of the cross arm, and the keeper 21 may be bent inwardly against the detent 12 so as to engage one of the teeth 20 and lock the parts together. The insulator is suspended from the bolt 13 by any suitable fitting 25 and it will be observed that because of the outward inclination of the extensions 24 and because of the slots 23, the weight of the insulator and conductor carried thereon will exert force on the lower ends of the members 10 and 11, tending to press them inwardly against the cross arm. The members 10 and 11 may be offset, as shown at 26, to give a certain amount of resiliency to the clamp and to facilitate assembling on the cross arms. If desired, the members 10 and 11 may be perforated as shown at 27 in order to permit a bolt to pass through the legs of the clamp and the cross arm, but ordinarily this bolt will not be required.

Where a clamp is used with cross arms having chamfered corners, indicated at 28, the wedge 20 may be dispensed with and the tongue 29 having an offset head 30 can be inserted through a slot 31 in the upper arm 14 by holding the lower end of the arm 11 outwardly. When the head 30 has been projected through the slot 31, the end of the arm 11 may be swung inwardly and secured by the bolt 13 which will place the head 30 in position to retain the parts together without the use of any additional locking mechanism. Cross arms with chamfered corners may usually be obtained at the same price as arms with square corners and with this form of cross arm, the construction shown in Fig. 3 provides a simple and economical insulator support which may be readily applied, and which requires no wedge or separate part for holding the members of the supporting band in position about the cross arm.

It will be apparent to those skilled in the art that various changes and modifications can be made in details of construction without departing from the spirit and scope of the invention, and I therefore do not wish to restrict the invention to details of construction other than as pointed out in the appended claims.

I claim:

1. A cross arm fitting comprising a pair of members arranged to form a band about a cross arm, said members having interfitting parts for detachably securing said members together, a wedging lock for holding said interfitting parts together, said lock having stepped teeth thereon, and a keeper for engaging one of said teeth to hold said lock in place.

2. A cross arm fitting for supporting an insulator, and wedging means actuated by the weight of an insulator supported by said fitting for clamping said fitting upon a cross arm.

3. A cross arm fitting for supporting insulators comprising a band adapted to extend about a cross arm, said band being open at one side thereof, means for suspending an insulator from said band, and wedging means supporting said suspending means and actuated thereby when an insulator is suspended thereon for drawing the ends of said band at the open side thereof toward each other.

4. A cross arm fitting comprising a split band adapted to extend about a cross arm, the ends of said band having inclined bearing faces thereon, and a support for an insulator slidably engaging said bearing faces and exerting a wedging action thereon tending to draw the ends of said band together to clamp said band about a cross arm.

5. A cross arm fitting comprising a band arranged to extend about a cross arm, said band being open at its lower side and having inclined extensions on the ends of said band, said extensions having slots therein, and a bolt passing through said slots for supporting an insulator, said bolt having wedging engagement with the projecting ends of the band for clamping the band upon said cross arm.

6. A cross arm fitting comprising a band formed of two separable sections, means for detachably securing said sections together at one point, and a support for an insulator securing said sections together at another point, said support having sliding wedging engagement with said sections for exerting a clamping force upon the cross arm.

7. A cross arm fitting comprising a pair of sections having interfitting portions for connecting said sections together at one point, a wedge lock for holding said interfitting portions together, a support for an insulator connecting said sections together at another point to form a band about a cross arm, said support having sliding wedging connection with said sections to cause the weight of an insulator carried thereby to draw said sections together about a cross arm disposed within said band and exert a clamping action on the cross arm.

8. A cross arm fitting for use with cross arms having chamfered corners comprising a member having a slot therein, and a second member having a tongue arranged to be extended through the slot and having a head disposed in position for retaining the parts together when in assembled relation and means for joining the ends of said members opposite said slot and tongue respectively, said joining means providing for ready separation of the ends to be joined thereby to permit insertion of said tongue in said slot and being arranged to join said ends after said insertion.

9. A cross arm fitting for cross arms having chamfered corners comprising a band composed of two parts, one of said parts having a slot and the other of said parts having a tongue arranged to enter said slot, the tongue being provided with a head adapted to pass through said slot when said parts are in one position relative to each other but disposed in position to hold the parts together when in assembled position on a cross arm, the slot being disposed in position in said first mentioned part to lie adjacent a chamfered corner of the cross arm to permit the insertion of the tongue and head thereon into the slot.

10. A fitting for supporting insulators on a cross arm having chamfered corners comprising a band formed of two parts arranged to be connected adjacent one corner of a cross arm, one of said parts having a slot therein and the other of said parts having a tongue provided with a head adapted to pass through said slot, the slot being arranged to lie adjacent the chamfered corner and the tongue being movable into position to permit said head to enter said slot by movement past said corner but being held in position to prevent said head from withdrawal from said slot when the band is clamped about the cross arm.

11. A fitting for a cross arm having chamfered corners comprising two members forming a band for encircling a cross arm, said members having interlocking parts movable into interlocked engagement adjacent one of the corners of a cross arm, the chamfered portion of which provides space for movement of said parts into interlocking engagement when said members are disposed in a particular relative position and a fastening device for holding said members in a different relative position to prevent disengagement of said interlocked parts when said members are secured in position on said cross arm.

12. A cross arm clamp comprising a band arranged to encircle a cross arm, said band being split at one side, and arranged to open sufficiently to permit the band to be placed about a cross arm between the ends thereof, and wedging means for holding the ends of the band together and for supporting an insulator, the weight of the insulator operating upon the wedging means to draw the ends of the bands together.

In testimony whereof I have signed my name to this specification this 28th day of November, A. D. 1930.

GEORGE W. HAMILTON.